(12) United States Patent
King et al.

(10) Patent No.: US 9,285,623 B2
(45) Date of Patent: Mar. 15, 2016

(54) TOUCH SCREEN SYSTEMS WITH INTERFACE LAYER

(71) Applicant: Corning Incorporated, Corning, NY (US)

(72) Inventors: Jeffrey Stapleton King, Menlo Park, CA (US); William Richard Trutna, Atherton, CA (US); Michael John Yadlowsky, Sunnyvale, CA (US)

(73) Assignee: CORNING INCORPORATED, Corning, NY (US)

( * ) Notice: Subject to any disclaimer, the term of this patent is extended or adjusted under 35 U.S.C. 154(b) by 270 days.

(21) Appl. No.: 14/043,174

(22) Filed: Oct. 1, 2013

(65) Prior Publication Data

US 2014/0098306 A1   Apr. 10, 2014

Related U.S. Application Data

(60) Provisional application No. 61/744,829, filed on Oct. 4, 2012.

(51) Int. Cl.
  *G02F 1/1335*   (2006.01)
  *G02F 1/1333*   (2006.01)
  *G06F 3/042*    (2006.01)

(52) U.S. Cl.
  CPC ............ *G02F 1/13338* (2013.01); *G06F 3/042* (2013.01); *G06F 2203/04109* (2013.01)

(58) Field of Classification Search
  CPC .............. G02F 1/13338; G06F 3/0421; G06F 2203/04109
  USPC ..................................... 349/12; 345/175, 176
  See application file for complete search history.

(56) References Cited

U.S. PATENT DOCUMENTS

| 4,484,179 A | 11/1984 | Kasday ......................... 340/365 |
| 4,511,760 A | 4/1985 | Garwin et al. .................. 178/18 |

(Continued)

FOREIGN PATENT DOCUMENTS

| EP | 0901229 | 6/2007 |
| EP | 2369451 | 9/2011 |

(Continued)

OTHER PUBLICATIONS

Machine translation of JP2011-103094.

(Continued)

*Primary Examiner* — Thanh-Nhan P Nguyen
(74) *Attorney, Agent, or Firm* — Jason A. Barron (57) ABSTRACT

A touch system for sensing a touch event that includes a transparent sheet having opposite upper and lower surfaces and an index of refraction $n_2$. The system also has at least one light source that emits light. The light source is arranged in optical communication with the transparent sheet to cause the light to travel within the transparent sheet by total-internal reflection (TIR). At least one detector is arranged to detect the TIR-traveling light and to detect an amount of attenuation in the TIR-traveling light caused by the touch event. An interface layer is disposed on the lower surface of the transparent sheet. The interface layer has a refractive index $n_1$, wherein $n_1 < n_2$, and has a thickness of equal to or greater than 1 micron. The interface layer obviates the need for an air gap when interfacing the touch system to a display unit of display device.

15 Claims, 4 Drawing Sheets

(56) References Cited

U.S. PATENT DOCUMENTS

| | | | |
|---|---|---|---|
| 4,542,375 A | 9/1985 | Alles et al. | 340/712 |
| 4,687,885 A | 8/1987 | Talmage, Jr. et al. | 178/18 |
| 4,725,978 A | 2/1988 | Fujioka | 364/900 |
| 5,222,400 A | 6/1993 | Hilton | 73/862.043 |
| 5,446,480 A | 8/1995 | Yoshida | 345/157 |
| 5,610,629 A | 3/1997 | Baur | 345/104 |
| 6,031,520 A | 2/2000 | De Gotari | 345/157 |
| 6,084,571 A | 7/2000 | De Gotari | 345/157 |
| 6,326,948 B1 | 12/2001 | Kobachi et al. | 345/157 |
| 6,504,530 B1 | 1/2003 | Wilson et al. | 345/173 |
| 6,556,149 B1 | 4/2003 | Reimer et al. | 341/20 |
| 6,788,295 B1 | 9/2004 | Inkster | 345/175 |
| 6,804,012 B2 | 10/2004 | Gombert | 356/614 |
| 6,816,537 B2 | 11/2004 | Liess | 372/109 |
| 6,900,795 B1 | 5/2005 | Knight, III et al. | 345/173 |
| 7,024,085 B2 | 4/2006 | Markwardt et al. | 385/129 |
| 7,157,649 B2 | 1/2007 | Hill | 178/18.04 |
| 7,158,054 B2 | 1/2007 | Pihlaja | 341/22 |
| 7,417,627 B2 | 8/2008 | Cok | 345/173 |
| 7,515,140 B2 | 4/2009 | Philipp | 345/173 |
| 7,685,538 B2 | 3/2010 | Fleck et al. | 715/863 |
| 7,786,978 B2 | 8/2010 | Lapstun et al. | 345/166 |
| 7,903,090 B2 | 3/2011 | Soss et al. | 345/173 |
| 7,920,124 B2 | 4/2011 | Tokita et al. | 345/156 |
| 8,013,845 B2 | 9/2011 | Ostergaard et al. | 345/176 |
| 8,049,739 B2 | 11/2011 | Wu et al. | 345/175 |
| 8,130,210 B2 | 3/2012 | Saxena et al. | 345/173 |
| 8,179,375 B2 | 5/2012 | Ciesla et al. | 345/173 |
| 8,253,712 B2 | 8/2012 | Klinghult | 345/174 |
| 8,325,158 B2 | 12/2012 | Yatsuda et al. | 345/176 |
| 8,368,677 B2 | 2/2013 | Yamamoto | 345/207 |
| 8,378,975 B2 | 2/2013 | Yoon et al. | 345/173 |
| 8,390,481 B2 | 3/2013 | Pance et al. | 341/33 |
| 8,395,601 B2 | 3/2013 | Nho et al. | 345/176 |
| 8,411,068 B2 | 4/2013 | Lu et al. | 345/175 |
| 8,553,014 B2 | 10/2013 | Holmgren et al. | 345/173 |
| 2001/0007449 A1 | 7/2001 | Kobachi et al. | 345/156 |
| 2003/0026971 A1 | 2/2003 | Inkster et al. | 428/304.4 |
| 2006/0096392 A1 | 5/2006 | Inkster et al. | 73/862.041 |
| 2008/0068343 A1 | 3/2008 | Hoshino et al. | 345/173 |
| 2008/0088597 A1 | 4/2008 | Prest et al. | 345/173 |
| 2008/0088600 A1 | 4/2008 | Prest et al. | 345/173 |
| 2008/0284742 A1 | 11/2008 | Prest et al. | 345/173 |
| 2008/0289884 A1 | 11/2008 | Elwell | 178/18.01 |
| 2008/0303797 A1 | 12/2008 | Grothe | 345/173 |
| 2009/0015564 A1 | 1/2009 | Ye et al. | 345/173 |
| 2009/0219253 A1 | 9/2009 | Izadi et al. | 345/173 |
| 2009/0219261 A1 | 9/2009 | Jacobson et al. | 345/175 |
| 2010/0001978 A1 | 1/2010 | Lynch et al. | 345/175 |
| 2010/0060548 A1 | 3/2010 | Choi et al. | 345/1.3 |
| 2010/0103123 A1 | 4/2010 | Cohen et al. | 345/173 |
| 2010/0103140 A1 | 4/2010 | Hansson | 345/175 |
| 2010/0117974 A1 | 5/2010 | Joguet et al. | 345/173 |
| 2010/0117989 A1 | 5/2010 | Chang | 345/175 |
| 2010/0156847 A1 | 6/2010 | No et al. | 345/175 |
| 2010/0207906 A1 | 8/2010 | Anglin et al. | 345/174 |
| 2010/0245288 A1 | 9/2010 | Harris | 345/175 |
| 2010/0253650 A1 | 10/2010 | Dietzel et al. | 345/175 |
| 2010/0302209 A1 | 12/2010 | Large | 345/175 |
| 2010/0302210 A1* | 12/2010 | Han | G06F 3/0412 345/175 |
| 2010/0321310 A1 | 12/2010 | Kim et al. | 345/173 |
| 2011/0069020 A1 | 3/2011 | Kim et al. | 345/173 |
| 2011/0122091 A1* | 5/2011 | King | G06F 3/0421 345/175 |
| 2011/0141053 A1 | 6/2011 | Bulea et al. | 345/174 |
| 2011/0157092 A1 | 6/2011 | Yang | 345/175 |
| 2011/0255303 A1 | 10/2011 | Nichol et al. | 362/606 |
| 2011/0298742 A1 | 12/2011 | Dingnan | 345/173 |
| 2012/0068939 A1 | 3/2012 | Pemberton-Pigott | 345/173 |
| 2012/0068970 A1 | 3/2012 | Pemberton-Pigott | 345/175 |
| 2012/0068971 A1 | 3/2012 | Pemberton-Pigott | 345/175 |
| 2012/0071206 A1 | 3/2012 | Pemberton-Pigott | 455/566 |
| 2012/0092250 A1 | 4/2012 | Hadas et al. | 345/156 |
| 2012/0176345 A1 | 7/2012 | Ye et al. | 345/175 |
| 2012/0212451 A1* | 8/2012 | Large | G06F 3/0425 345/175 |
| 2012/0242607 A1 | 9/2012 | Ciesla et al. | 345/173 |
| 2012/0326981 A1 | 12/2012 | Kurose | 345/160 |
| 2013/0107306 A1 | 5/2013 | Yoon et al. | 358/1.13 |
| 2013/0135254 A1 | 5/2013 | Lee et al. | 345/175 |
| 2013/0314368 A1* | 11/2013 | Li | G06F 3/0421 345/174 |

FOREIGN PATENT DOCUMENTS

| | | |
|---|---|---|
| EP | 2392904 | 12/2011 |
| EP | 2437144 | 4/2012 |
| EP | 2437145 | 4/2012 |
| EP | 2439620 | 4/2012 |
| EP | 2439619 | 5/2012 |
| FR | 2963839 | 8/2010 |
| GB | 2313195 | 11/1997 |
| JP | 2011103094 | 5/2011 |
| WO | 02/35460 | 5/2002 |
| WO | 2010/063320 | 6/2010 |
| WO | 2012/027599 | 3/2012 |
| WO | 2012/087286 | 6/2012 |
| WO | 2013/029641 | 3/2013 |
| WO | 2013/037385 | 3/2013 |
| WO | 2013/068651 | 5/2013 |

OTHER PUBLICATIONS

Machine translation of FR2963839.

* cited by examiner

SPATIAL DISTRIBUTION

Fig. 7

SPATIAL DISTRIBUTION

Fig. 8

SPATIAL DISTRIBUTION

TOUCH SCREEN SYSTEMS WITH INTERFACE LAYER

CROSS-REFERENCE TO RELATED APPLICATIONS

This application claims the benefit of priority under 35 U.S.C. §119 of U.S. Provisional Application Ser. No. 61/744,829, filed on Oct. 4, 2012, the content of which is relied upon and incorporated herein by reference in its entirety.

FIELD

The present disclosure relates to touch-sensitive devices, and in particular to touch screen systems with an interface layer that allows the touch screen to be interfaced with a display.

BACKGROUND ART

The market for displays and other devices (e.g., keyboards) having non-mechanical touch functionality is rapidly growing. As a result, touch-sensing techniques have been developed to enable displays and other devices to have touch functionality. Touch-sensing functionality is gaining wider use in mobile device applications, such as smart phones, e-book readers, laptop computers and tablet computers, all of which include display units for displaying information and for interacting with a user.

Touch systems in the form of touch sensors have been developed that respond to a variety of types of touches, such as single touches, multiple touches, and swiping. Some of these systems rely on light-scattering and/or light attenuation based on making optical contact with a touch-screen surface, which remains fixed relative to its support frame. An example of such a touch-screen system is described in U.S. Patent Application Publication No. 2011/0122091.

Some touch sensors rely on the principle of Total Internal Reflection (TIR) to guide light within a thin sheet of transparent material. Light is conveyed within the thin sheet between sets of light sources and detectors operably disposed about the periphery of the sheet. A finger or other implement that touches the surface of the thin sheet will typically interact with the evanescent portion of internally reflected and transmitted light that extends just beyond the surface of the sheet. This causes attenuation of the guided light by what is called "frustrated TIR" or FTIR.

In some instances, touch screens are interfaced with an underlying display unit to form a touch-sensitive or touch-sensing display. The touch screen usually needs to be separated from the underlying display unit by an air gap so that the display unit does not interfere with the TIR propagation of light within the transparent sheet and cause attenuation. Bonding the touch screen to a liquid-crystal display (LCD), for example, would cause most of the guided light to leak into the LCD, where it is then absorbed or scattered. Yet, there are many applications where bonding the touch screen directly to another member such as a display unit or support substrate would be beneficial.

SUMMARY

Aspects of the disclosure are directed to touch screen systems with an interface layer that is configured to allow for a thin transparent sheet of a touch-screen system to be attached to another member such as a display unit without substantial adverse effect on the TIR light that travels within the transparent sheet. Usually, bonding the touch screen to an LCD, for example, would cause most of the guided light to leak into the display below, where it is absorbed or scattered. There are many examples of designs that would benefit from directly bonding the touch-sensing transparent sheet to the underlying surface, such as the LCD in a tablet or smart phone. Examples of other members to which the touch screen system can be attached include polymer, glass, metal, an appliance, a window, and generally any surface of any device where it is desirable to add touch functionality.

The direct bond approach has benefits including greater optical transparency, thinner construction, and potentially mechanical advantages. Direct bonding is the preferred method for smart phone construction, and is increasingly prevalent in tablets. The systems and methods of this disclosure enable bonding, laminating, or otherwise attaching or interfacing a TIR optical touch screen to a member that is absorbing or otherwise has a lossy surface, with no loss of functionality.

The systems and methods described herein employ an interface layer that resides on the lower side of the transparent sheet. The interface layer has an index of refraction that is lower than that of the transparent sheet. It also has a thickness that prevents the underlying display unit from substantially interacting with the evanescent portion of the light that resides within the interface layer. The interface layer can be made of an organic material or an inorganic material.

In an example, the refractive index of the interface layer is less than that of a finger (skin has a refractive index of about 1.42) to allow for sensitivity to finger-based touches. The interface layer allows for the usual air gap between the display unit and the transparent sheet to be eliminated.

Additional features and advantages of the disclosure are set forth in the detailed description that follows, and in part will be readily apparent to those skilled in the art from that description or recognized by practicing the disclosure as described herein, including the detailed description that follows, the claims, and the appended drawings.

The claims as well as the Abstract are incorporated into and constitute part of the Detailed Description set forth below.

All publications, articles, patents, published patent applications and the like cited herein are incorporated by reference herein in their entirety, including U.S. Patent Application Publication No. 2011/0122091 and U.S. Provisional Patent Applications No. 61/564,003 and 61/564,024.

DETAILED DESCRIPTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Figure 1:
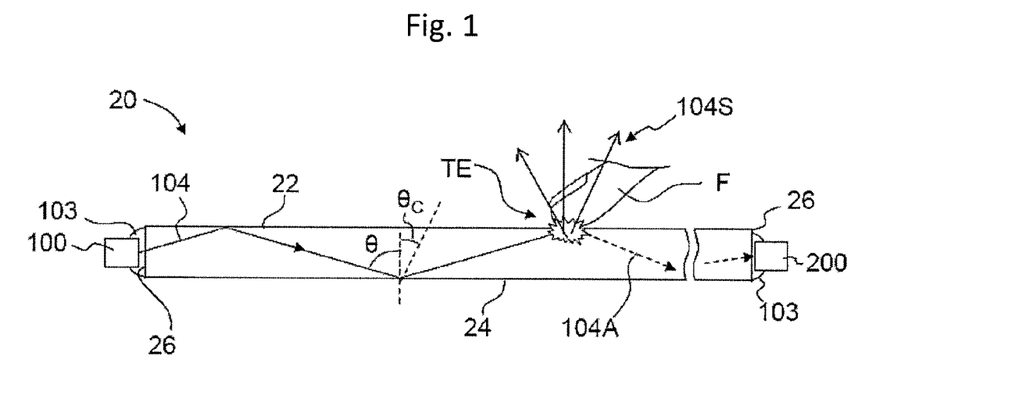
FIG. 1 is cross-sectional view of a transparent sheet illustrating how a touch event is sensed with edge-coupled LEDs and photodiodes.

FIG. 1 is a cross-sectional view of a transparent sheet 20 for use in a touch-based display system 10 (the combination of the transparent sheet and the display 400 along with any intermediate layers (e.g., air gap 300, index-matched adhesive 500, or low index layer 600) as shown in FIGS. 2-5. The display system 10 may be used in a variety of consumer electronic articles, for example, in conjunction with displays for cell-phones, keyboards, touch screens, smart phones, and other electronic devices such as those capable of wireless communication, music players, notebook computers, mobile devices, game controllers, computer "mice," electronic book readers, appliances (e.g., refrigerators, televisions, etc.), and the like.

At least one light source 100 and at least one detector 200 are disposed adjacent to the transparent sheet perimeter (edge-coupled) or below (face-coupled) and may be coupled to the transparent sheet 20 via an index-matched adhesive 103. One light source 100 and one detector 200 are shown by way of example, with an example light beam (light) 104 from the light source shown traveling over a TIR optical path from the light source to the detector. The travel of multiple light beams 104 within transparent sheet 20, as well TIR-based touch systems and signal detection and processing for such systems is discussed in U.S. Pat. No. 8,436,833, U.S. application Ser. Nos. 13/686,426 and 13/686,571, U.S. Publ. No. 2011/0122091, and U.S. Prov. Appl. Nos. 61/731,841 and 61/640,605, all of which are incorporated by reference in their entireties. Light 104 is also referred to herein as TIR light 104 since it travels within the transparent sheet by TIR.

Light sources 100 and detectors 200 can be coupled directly to the transparent sheet from the edge, top or bottom. Alternatively, light sources 100 and detectors 200 can be optically coupled to transparent sheet 20 using optical means, such as lenses, prisms, gratings, etc., to achieve a desired distribution of light 104 to travel within the transparent sheet. The use of optical means to facilitate optical coupling can be used to increase or optimize the coupling efficiency and increase performance of the display system 10.

Example detectors 200 include photodiodes and various types of known photosensors. Example light sources 100 include LEDs, laser diodes, optical-fiber-based lasers, extended light sources, and the like. An example operating wavelength for light sources 100 is 850 nm. Similar infrared and near-infrared wavelengths can be used (e.g., 950 nm). In an example, the operating wavelength is outside of the visible wavelength spectrum but not so far into the infrared that the light is substantially attenuated when traveling as guided light within the transparent sheet waveguide.

The transparent sheet 20 includes a bulk portion or body 21, an upper surface 22, a lower surface 24 and at least one edge 26 that defines a perimeter 27. An example transparent sheet 20 is generally rectangular and includes four edges 26. Other shapes for transparent sheet 20 may be used, such as circular. Moreover, transparent sheet 20 may be shaped to create a 3D shape in space. For example, it may have downwardly curved edges 26. Edges 26 can be beveled, rounded, tapered or have another shape. Generally, transparent sheet 20 can have any reasonable configuration that allows it to serve as a waveguide for light 104, while also being able to provide a place where a user can apply a touch event TE via a finger F or other comparable touch device to elicit a response.

With reference again also to FIG. 1, transparent sheet 20 has a thickness TH, which is substantially uniform (i.e., top and lower surfaces 22 and 24 are substantially parallel). In an example, transparent sheet 20 is rectangular and has a dimension (length) LX in the X-direction and a length LY in the Y-direction, and so has four corners defined by four edges 26.

Generally, transparent sheet 20 can have a shape wherein edges 26 define multiple corners.

The transparent sheet 20 may generally be made of any suitably transparent material that can be formed into a thin planar sheet, such as plastic, acrylic, glass, etc., and that supports the transmission of light 104 at the operating wavelength within its body 21 without substantial loss due to scattering or absorption. In an example embodiment, transparent sheet 20 has a thickness TH2 that allows it to flex without breaking when pressure is locally applied at upper surface 22. In another embodiment, the thickness TH2 is selected to that transparent sheet 20 does not substantially flex when pressure is locally applied at upper surface 22. An exemplary range of thickness TH2 for transparent sheet 20 is from 50 microns to 5 mm. Other thickness TH2 can be employed consistent with the particular application for touch system 10.

In an example embodiment, transparent sheet 20 may be a chemically strengthened glass, such as a soda-lime-type glass. An example glass for transparent sheet 20 is an alkali aluminosilicate glass hardened through ion exchange. These types of glass can comprise $Na_2O$ (soda), CaO (lime) and $SiO_2$ (silica), but can also include oxides such as MgO, $Li_2O$, $K_2O$, ZnO, and $ZrO_2$, as well as $Al_2O_3$. Once hardened through ion exchange, these types of glass exhibit certain characteristics that make them desirable for touch screen applications, as well as other applications (e.g., as a cover glass). Further details as to the formulation or production, or both, of soda-lime-type glass suitable for use as transparent sheet 20 may be found in one or more of U.S. patent application Ser. No. 11/888,213 filed Jul. 31, 2007; U.S. patent application Ser. No. 12/537,393 filed Aug. 7, 2009; U.S. patent application Ser. No. 12/545,475 filed Aug. 21, 2009; and U.S. patent application Ser. No. 12/392,577 filed Feb. 25, 2009. An exemplary glass for transparent sheet 20 is Gorilla® glass, from Corning, Inc., Corning, N.Y. Also, an exemplary glass, such as low-iron Gorilla® glass or other low-iron ion-exchanged glass, is transparent to IR-wavelength light 104.

With reference again to FIG. 1, light source 100 is operably disposed adjacent perimeter 27 of transparent sheet 20. In an embodiment, light source emits light 104 at an IR wavelength, such as between 750 nm and 950 nm. In the discussion below, light 104 is also referred to as "light ray" 104 or "light rays" or "light beam" 104 or "light beams" 104 where appropriate.

The transparent sheet 20 is usable for TIR touch-based sensing in the following way: when light source 100 is activated, it emits light 104 (light rays) that travels into body 21 of transparent sheet 20 over a large number of optical paths. The portion of light 104 that has an angle beyond a critical internal reflection angle $\theta_C$ of transparent sheet 20 remains trapped in transparent sheet body 21 via TIR and travels therein. If the travel of internally reflected light 104 remains uninterrupted, it will arrive at detector 200. Thus, transparent sheet 20 acts as a planar optical waveguide that supports a large number of guided modes, i.e., light rays 104 that travel within the transparent sheet over a wide range of an internal reflection angles $\theta$ beyond critical internal reflection angle $\theta_C$. The air interface at upper and lower surfaces 22 and 24 allows for TIR to occur because the index of refraction of air is lower than that of transparent sheet 20.

Detector 200 is configured to convert the detected light 104 in the aforementioned detector electrical SD, which in an example is a photocurrent. The detector electrical signal SD is then sent to a computer processor for processing to determine information (e.g., pressure, location, duration, etc.) relate to touch event TE.

As noted above, the light source 100 and detector 200 may be coupled to the transparent sheet in a number of ways, such as via edge- or face-coupling. The face-coupling configuration offers several advantages over the edge-coupling configuration, including simpler manufacturing, no bezel requirement, and potentially increased touch sensitivity via higher bounce angles of light ray 104. However, on the downside, modeling indicates that about 28% of light 104 outputted by light-source element 102 can be trapped within transparent sheet 20 using the face-coupling configuration as compared to about 80% for the edge-coupling configuration.

With continuing reference to FIG. 1, when a touch event TE occurs, such as when a person's finger F touches upper surface 22 of transparent sheet 20, it locally changes the TIR condition of the waveguide as defined by transparent sheet body 21 and top and lower surfaces 22 and 24. This causes light 104 to be coupled out of transparent sheet body 21 by FTIR. This out-coupled light is denoted as light 104S, which exist the waveguide at the point (or more accurately, over the area of optical contact) where upper surface 22 is touched. This acts to attenuate light beam 104 to form an attenuated light beam 104A that continues propagating within body 21 of transparent sheet 20. The touching of upper surface 22 defines the aforementioned touch event TE and touch-event location TL. Light 104S is referred to herein as scattered light for ease of explanation, though this light may simply be exiting the waveguide without scattering, while some of the light is absorbed by the finger, and some of the light is indeed scattered.

The intensity of attenuated light beam 104 arriving at detector 200 gives rise to a changed signal strength (e.g., a changed photocurrent) for detector electrical signal SD (as compared to, say, a baseline photocurrent measurement with the original light beam 104), and indicates that a touch event TE has occurred. A threshold value T for the measured detector electrical signal SD can be used to determine whether a touch event TE has occurred.

Figure 2:
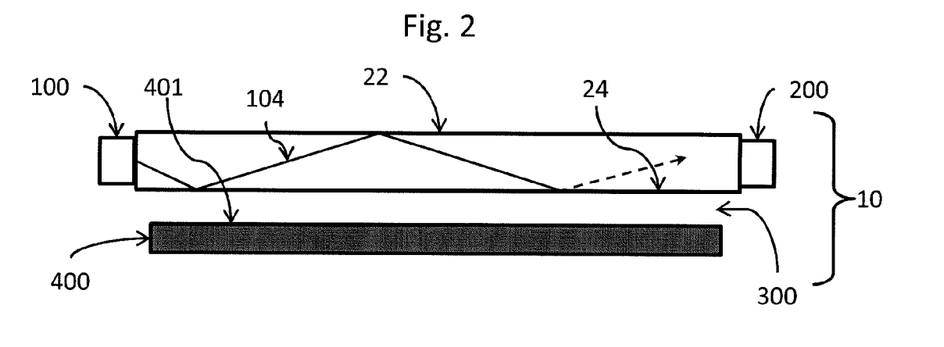
FIG. 2 is a cross-sectional view of a transparent sheet with an air gap.

FIG. 2 is similar to FIG. 1, but illustrates an example display system 10 where transparent sheet 20 is combined with a liquid crystal display ("LCD") 400. Note that while 400 is described herein as a LCD, it can be any kind of light-emitting display, such as a an OLED display, an e-ink display or a plasma display. The lower surface 24 of the transparent sheet 24 and the upper surface of the LCD 401 are spaced apart to define an air gap 300. The critical angle is the angle at which the transition from TIR to transmission occurs, and is calculated as $Arcsin(n_1/n_2)$, where $n_2$ is the refractive index of the touch sensor material and $n_1$ is the index of the low index coating. For an example transparent sheet 20 made of Gorilla® glass, the refractive index $n_2$ of the transparent sheet is about 1.51, while the refractive index $n_0$ of the surrounding air is about 1.0. For an FTIR-based touch screen with an air gap, the interface between the waveguide and air (n=1.0) defines the critical angle, which is 42 degrees (with regard to the normal to the surface of the waveguide) for the glass/air case. Thus, the air gap provides a difference in refractive indices at the interface which optimizes the amount of light that is retained within the transparent sheet 20.

Figure 3:
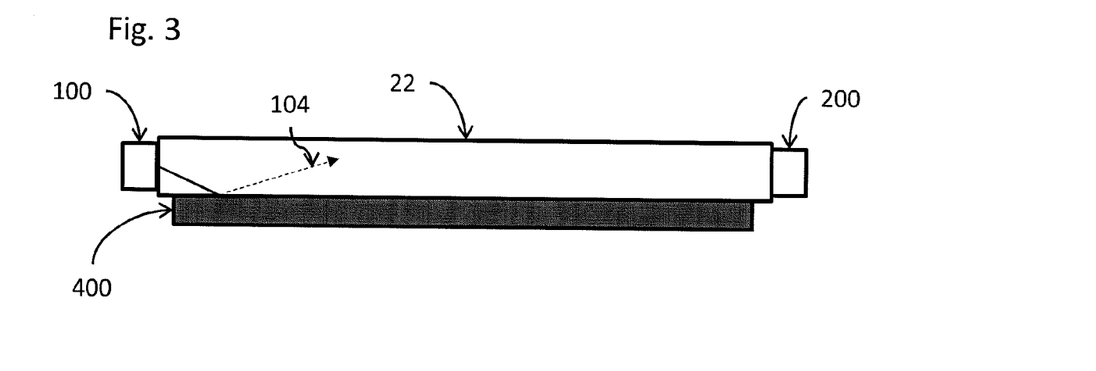
FIG. 3 is a cross-sectional view of a transparent sheet directly bonded to an LCD.
Figure 4:
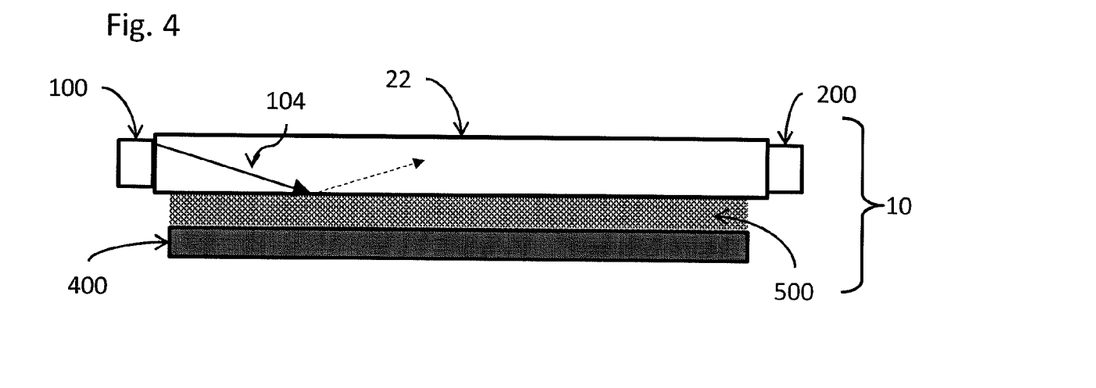
FIG. 4 is a cross-sectional view of a transparent sheet directly bonded to an LCD with an index matching adhesive.

FIGS. 3 and 4 show examples of touch screen 20 either in direct contact with LCD 400 or with an underlying lossy substrate 500. If the touch sensor is directly bonded to the LCD or an underlying lossy substrate, the light that is used for sensing will be greatly attenuated, reducing the ability of the screen to detect touches. If the refractive index of either the material that defines upper surface 401 any bonding material 500 (or index-matching material) is greater than the refractive index of the user's finger or equal to or greater than that of transparent sheet 20, then all of the frustrated TIR (FTIR) sensitivity will be lost.

Figure 5:
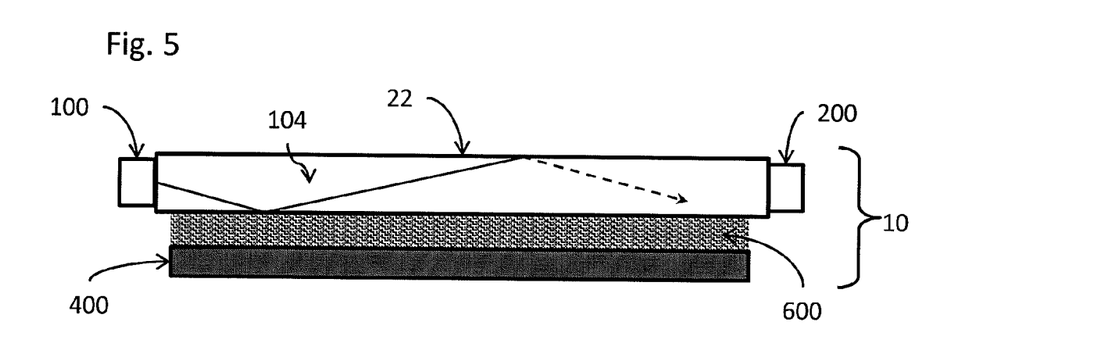
FIG. 5 is a cross-sectional view of a transparent sheet directly bonded to an LCD with a low index layer material. The critical angle increases, but waveguiding still occurs and touch sensitivity is not degraded.

However, coating the underside of the touch sensor with a layer of low index material 600 having a refractive index significantly below that of the touch sensor material will confine a significant portion of the light to the waveguide, maintaining touch sensitivity even if the sensor is bonded to an underlying lossy material (FIG. 5). The lower the index of the low index material 600, the less light will be lost to the underlying substrate. This low index material 600 can be an organic material or an inorganic material. In addition, the low-index layer must have lower refractive index than epidermis (1.42) (except under conditions where other implements are to be used in connection with transparent sheet 20—under such conditions the constraint on the interface layer refractive index $n_1$ depends on the nature of the implement used to create the touch event TE. In example embodiments, $n_1 \leq (0.9) \cdot n_2$, or $n_1 \leq (0.85) \cdot n_2$, or $n_1 \leq (0.8) \cdot n_2$.).

In some embodiments, the low index material must further have a thickness sufficient to prevent any penetration of the evanescent wave formed by TIR into the lossy underlying surface. While evanescent wave theory is beyond the scope of this teaching, it is generally understood that the strength of the evanescent wave decays exponentially from upper and lower surfaces 22 and 24 of transparent sheet 20. The effective penetration depth $\delta$ of an evanescent wave from upper and lower surfaces (e.g., the $1/e^2$ value of the intensity) is denoted by $\delta_U$ and $\delta_L$ respectively. These depths are different since $n_1 > n_0$, which means that $\delta_U < \delta_L$. Light rays 104 traveling at different angles within transparent substrate 20 will also have different penetration depths. Thus, an object such as LCD 400 placed close enough to lower surface 24 can interact with the evanescent wave and disrupt the transmission of the guided light 104. In some embodiments, low index layer 600 should have a thickness TH1 selected to substantially prevent any object from interacting with the evanescent wave. In an example, thickness TH1 is at least as great as the $1/e^2$ intensity point of the evanescent wave, where $\delta_L = 1/e^2$ (i.e., TH1 > $\delta_L$). For $n_1 \approx 1.3$, $\delta_L < 500$ nm. For example, for a transparent sheet 20 made of Gorilla® Glass for which $n_2 = 1.51$, the penetration depth $\delta_L$ for TIR light having an angle of 65° is 340 nm. Thus, an interface layer thickness TH1 ≥ 1 micron should be sufficient for this case as well as for most applications in which $n_2 = 1.5$ (which is the case for most glasses). Thickness TH1 may need to be larger if the refractive index $n_2$ is smaller or if the refractive index of the touch sensor is made closer to that of the epidermis or touch stylus. An example range of thickness TH1 for interface layer 400 is 1 micron to 2 microns.

EXAMPLES

Figure 6:
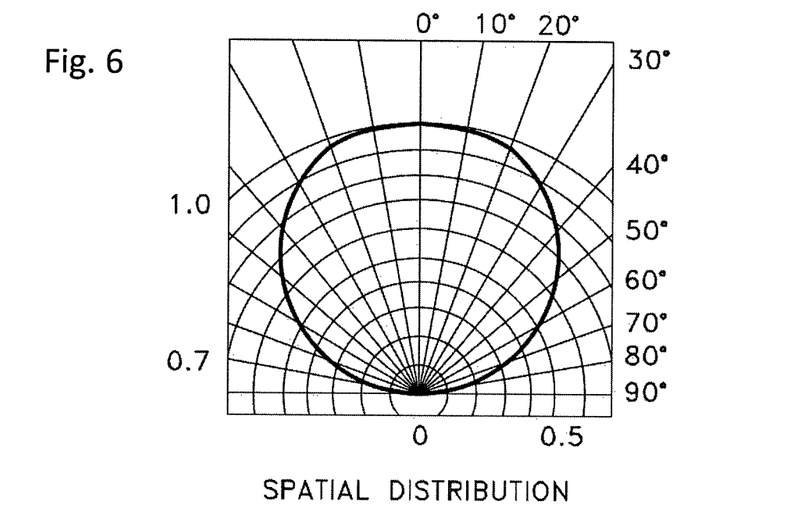
FIG. 6 shows a typical emission spatial distribution for an LED die (Kingbright APHS1608SF7C).
Figure 7:
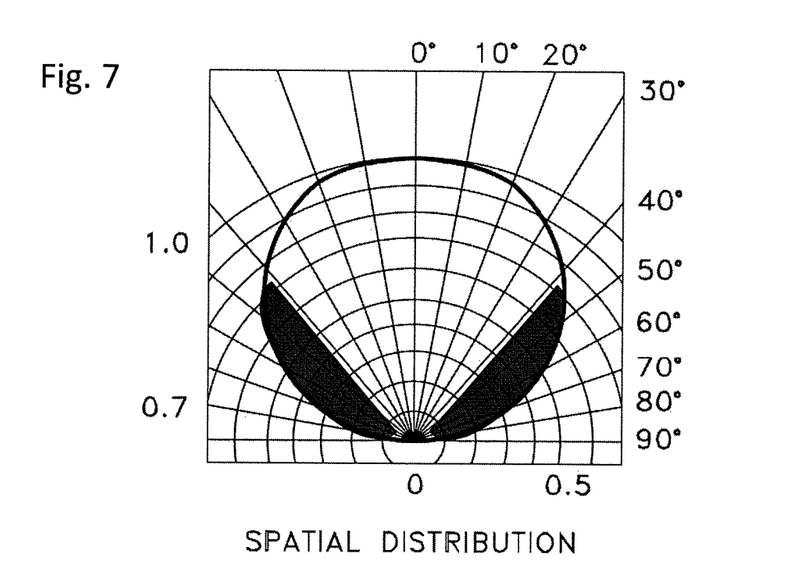
FIG. 7 shows the approximate portion of the LED emission that is coupled to the waveguide in a face-coupled configuration with an air gap (darkened portion of circle) (Critical angle=42°).
Figure 8:
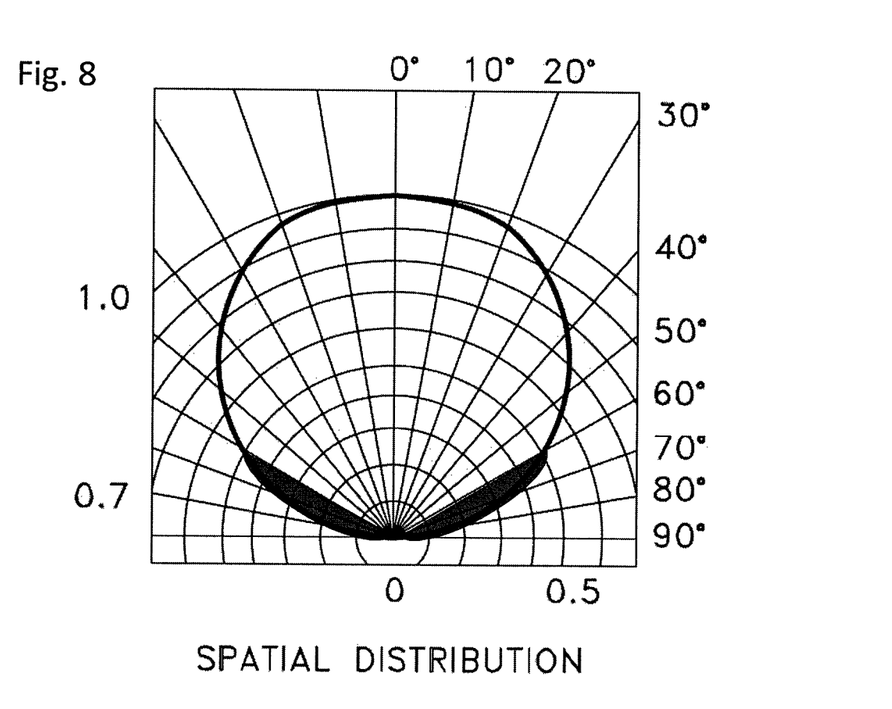
FIG. 8 shows the approximate portion of the LED emission that is coupled to the waveguide in a face-coupled configuration with a Teflon-AF coating and direct bonding to lossy substrate (darkened portion of circle) (Critical Angle=60°).

In an experiment, water (n=1.33) was used the simulate low index layer 600 for a 2"×2" transparent sheet 20 of Gorilla® glass. Light source 100 was a face-coupled LED. Of note, the typical LED radiates the most photons normal to the surface and the fewest 90 degrees from normal (FIG. 6). Moreover, the radiation pattern falls off rapidly with angle, so that by 60°, the normalized intensity is below 0.5. Thus, most of the energy from an LED light source is radiated at angles below the critical angle and does not travel in transparent sheet 20 as TIR light 104. For $n_1 = 1$, critical angle $\theta_C = 42°$. For $n_1 = 1.33$, critical angle $\theta_C = 62°$. FIGS. 7 and 8 show the difference in coupled light going from a critical angle $\theta_C$ of 42° to 62°. This difference means that a significant amount of light will not be coupled to the waveguide using a simple "face-coupled" configuration with LED light source 100.

Experiments using an LCD display unit 400 and transparent sheet 20 separated by the water interface layer 600 showed a 71% decrease in the coupled light. This decrease is to be expected, given the emission pattern of an LED light source 100.

In the above-described experiment, the sensitivity to a finger touch was studied. The attenuation amount when a finger was pressed on the glass touch screen line was 50%, which is suitable for touch detection.

In another experiment similar to the one described above, an example low index layer 600 was made from a fluoropolymer, which was coated on lower surface 24 of a Gorilla® glass transparent sheet 20. This low index layer 600 has a refractive index $n_1 = 1.31$, which yields a critical angle $\theta_C = 60°$. A 72% attenuation was observed when coupling the fluoropolymer-coated glass to the LCD using glycerin (n=1.47). For comparison, finger touches on upper surface 22 of an uncoated Gorilla® glass transparent sheet prior to coupling to the LCD 400 (i.e. with an air gap) resulted in attenuation of 85%. After coupling to the LCD, the attenuation of the baseline signal was 96% and a touch yielded 55% attenuation of this remaining signal. For the fluoropolymer-coated transparent sheet 20, after coupling to the LCD 400, the attenuation of the baseline signal was 72%, and a finger touch yielded 88% attenuation of this remaining signal.

Other example low-index materials suitable for use as low index layer 600 include DuPont TEFLON® AF 2200 ($n_1 = 1.29$), $MgF_2$ AR film ($n_1 = 1.39$), porous silica films (like aerogel, zeolite, Vycor, etc.), and any number of low-index organic materials, such as fluorinated or high porosity polymers. Low index layer 600 may be formed using any of the techniques known in the art for forming thin layers of material, such as vapor deposition, spin-coating, dipping, spraying, etc.

Touch system 10 can be used in combination with conventional or position-sensing display units, such as those that are capacitive-based and resistive-based.

The systems and methods herein provide a number of advantages. One advantage is that it eliminates the air gap between the transparent sheet and the underlying display unit. This allows for thinner display systems having greater optical transmission due to reduced loss, less stray light, reduced Fresnel reflection, and reduced parallax. Another advantage is that the interface layer can be selected to tune the operation of touch system 10, e.g., to selectively control the sensitivity of the touch system to a particular type of touch event (finger, stylus, etc.), as well as reducing the effects of incidental/unwanted contact with the upper surface of the transparent sheet.

While aspects of the disclosure have been described above in connection with interfacing the display system 10 via an LCD 400 and transparent sheet 20 by way of example, the principles and operation of the disclosed touch system and device interface layer apply equally to interfacing the system with any other display or non-display member or additional member surfaces, such as a support substrate, an appliance, the aforementioned electronic devices and system, etc. Also, the device interface layer 600 may first be added to LCD 400 and then the transparent substrate 20 or vice versa to achieve the same operable configuration for the combined system.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A touch system for sensing a touch event, comprising:
   a planar transparent sheet having opposite upper and lower surfaces and an index of refraction $n_2$;
   at least one light source that emits light, the light source operably arranged in optical communication with the planar transparent sheet to cause the light to travel within the planar transparent sheet by total-internal reflection (TIR);
   at least one detector operably arranged to detect the TIR-traveling light and to detect an amount of attenuation in the TIR-traveling light cause by the touch event;
   a display unit having an upper surface; and
   an interface layer contacting the lower surface of the planar transparent sheet and the upper surface of the display unit, wherein the interface layer has a refractive index $n_1$, wherein $n_1 < n_2$, and having a thickness of equal to or greater than 1 micron.

2. The touch system of claim 1, wherein $n_1 < 1.42$.

3. The touch system of claim 1, wherein $n_1 < 0.9 \cdot n_2$.

4. The touch system of claim 1, wherein $n_1 < 0.85 \cdot n_2$.

5. The touch system of claim 1, wherein $n_1 < 0.8 \cdot n_2$.

6. The touch system of claim 1, wherein the touch screen comprises an ion-exchanged glass substrate.

7. The touch system of claim 1, wherein the interface layer is substantially transparent to infrared light having a wavelength of 850 nm and is substantially transparent to visible light.

8. The touch system of claim 1, wherein the interface layer comprises a $MgF_2$ AR film, a porous silica film or a fluorinated or high-porosity polymer.

9. The display system of claim 8, wherein the display unit comprises a smart phone or electronic tablet display.

10. The touch system of claim 1, wherein the display unit includes a liquid-crystal display, an OLED display, an e-ink display or a plasma display.

11. The touch system of claim 1, wherein the planar transparent sheet is flexible.

12. The touch system of claim 11, wherein the flexible planar transparent sheet has applied touch pressure-sensing capability.

13. The display system of claim 12, wherein the display unit further comprises a capacitive or resistive touch-sensing capability.

14. A touch system for sensing a touch event, comprising:
   a planar transparent sheet having opposite upper and lower surfaces and an index of refraction $n_2$;
   at least one light source that emits light, the light source operably arranged in optical communication with the planar transparent sheet to cause the light to travel within the planar transparent sheet by total-internal reflection (TIR);
   at least one detector operably arranged to detect the TIR-traveling light and to detect an amount of attenuation in the TIR-traveling light cause by the touch event;
   an interface layer on the lower surface and having a refractive index $n_1$, wherein $n_1 < n_2$, and having a thickness of equal to or greater than 1 micron; and
   a display unit having a surface, wherein the interface layer is in intimate contact with the display unit surface.

15. The touch system of claim 14, wherein $n_1 < 0.8 \, n_2$.

* * * * *